(12) United States Patent
Hsieh et al.

(10) Patent No.: US 10,101,944 B2
(45) Date of Patent: Oct. 16, 2018

(54) SOLID STATE STORAGE DEVICE AND DATA WRITING METHOD THEREOF

(71) Applicants: Lite-On Electronics (Guangzhou) Limited, Guangzhou (CN); LITE-ON TECHNOLOGY CORPORATION, Taipei (TW)

(72) Inventors: Sheng-Jen Hsieh, Taipei (TW); Wei-Chi Hsu, Taipei (TW); Chung-Ming Su, Taipei (TW); Sen-Ming Chuang, Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 128 days.

(21) Appl. No.: 15/262,599

(22) Filed: Sep. 12, 2016

(65) Prior Publication Data
US 2017/0371584 A1 Dec. 28, 2017

(30) Foreign Application Priority Data

Jun. 28, 2016 (CN) .......................... 2016 1 0502949

(51) Int. Cl.
*G06F 3/06* (2006.01)
*G06F 12/02* (2006.01)

(52) U.S. Cl.
CPC .......... *G06F 3/0656* (2013.01); *G06F 3/0604* (2013.01); *G06F 3/0652* (2013.01); *G06F 3/0679* (2013.01); *G06F 12/0246* (2013.01); *G06F 12/0253* (2013.01); *G06F 2212/7205* (2013.01)

(58) Field of Classification Search
CPC ............ G06F 12/0246; G06F 12/0253; G06F 2212/7205; G06F 3/0688; G06F 3/0652; G06F 3/0679; G06F 3/0604; G06F 3/0656
See application file for complete search history.

(56) References Cited

U.S. PATENT DOCUMENTS

| | | | | |
|---|---|---|---|---|
| 2008/0091871 A1* | 4/2008 | Bennett | ............... | G06F 12/0246 711/103 |
| 2012/0121124 A1* | 5/2012 | Bammer | ............... | G06K 9/3216 382/103 |
| 2012/0151124 A1* | 6/2012 | Baek | ................... | G06F 12/0246 711/103 |
| 2013/0097365 A1* | 4/2013 | Lee | ..................... | G06F 12/0246 711/103 |
| 2015/0261444 A1* | 9/2015 | Yoshii | .................... | G11C 16/10 711/103 |
| 2016/0313943 A1* | 10/2016 | Hashimoto | ............. | G06F 3/061 |

* cited by examiner

*Primary Examiner* — Zhou H Li
(74) *Attorney, Agent, or Firm* — WPAT, PC

(57) ABSTRACT

A data writing method for a solid state storage device is provided. The solid state storage device includes a flash memory with plural blocks. The data writing method includes the following steps. Firstly, a flush command is received. Then, host write data in a buffer are stored into an open block of the flash memory according to a program order. Then, a garbage collection is performed to acquire collected write data from a close block of the flash memory and temporarily store the collected write data into the buffer. Then, the host write data and the collected write data in the buffer are stored into the open block of the flash memory according to the program order.

17 Claims, 9 Drawing Sheets

SOLID STATE STORAGE DEVICE AND DATA WRITING METHOD THEREOF

This application claims the benefit of People's Republic of China Patent Application No. 201610502949.0, filed Jun. 28, 2016, the subject matter of which is incorporated herein by reference.

FIELD OF THE INVENTION

The present invention relates to a solid state storage device and a control method thereof, and more particularly to a solid state storage device and a data writing method in response to a flush command.

BACKGROUND OF THE INVENTION

As is well known, a solid state drive (SSD) is a data storage device that uses a NAND-based flash memory to store data. The NAND-based flash memory is a non-volatile memory. After data are written to the flash memory, if the system is powered off, the data are still retained in the flash memory.

FIG. 1A schematically illustrates the architecture of cells in the flash memory of a solid state storage device. The flash memory 105 has a memory array composed of plural cells. Generally, each cell of the flash memory 105 has a floating gate transistor. During a program cycle of the flash memory 105, hot carriers are injected into the floating gate of the floating gate transistor. By controlling the amount of hot carriers to be injected into the floating gate, the threshold voltage of the floating gate transistor can be changed. Consequently, the storing state of the cell is determined according to the threshold voltage. During an erase cycle, the hot carriers are ejected from the floating gate of the floating gate transistor. The memory array comprises plural word lines $WL(n-1)$, $WL(n)$ and $WL(n+1)$ for controlling respective rows of cells. When one of the plural word lines is activated, the cells in a selected row corresponding to the activated word line are programmed.

Depending on different designs, the flash memories are classified into single-level flash memories (SLC) and multi-level flash memories. The multi-level flash memories include double-level flash memories, triple-level flash memories or more-level flash memories.

FIG. 1B schematically illustrates the threshold voltage distribution curves of the various flash memories in different storing states. The single-level flash memory can store only one bit of data per cell (i.e., 1 bit/cell). According to the amount of the hot carriers injected into the cell, each cell of the single-level flash memory has two storing states corresponding to two threshold voltage distribution curves. For example, the cell with the lower threshold voltage has the storing state "0", and the cell with the higher threshold voltage has the storing state "1". The storing state "0" and the storing state "1" are two different storing states. Moreover, the storing state "0" also indicates a first storing state, and the storing state "1" also indicates a second storing state. For example, the cell with the threshold voltage of approximately 0V has the first storing state, and the cell with the threshold voltage of approximately 10V has the second storing state.

The double-level flash memory can store two bits of data per cell (i.e., 2 bits/cell). According to the amount of the hot carriers injected into the cell, each cell of the double-level flash memory has four storing states corresponding to four threshold voltage distribution curves. According to the threshold voltages in ascending order, the storing states of the cells include the storing state "00", the storing state "01", the storing state "10" and the storing state "11".

The triple-level flash memory can store three bits of data per cell (i.e., 3 bits/cell). According to the amount of the hot carriers injected into the cell, each cell of the triple-level flash memory has eight storing states corresponding to eight threshold voltage distribution curves. According to the threshold voltages in ascending order, the storing states of the cells include the storing state "000", the storing state "001", the storing state "010", the storing state "011", the storing state "100", the storing state "101", the storing state "110" and the storing state "111".

In other words, during the program cycle of the flash memory, the threshold voltage and the storing state of the cell are correspondingly changed by controlling the amount of the hot carriers injected into the cell. For programming the single-level flash memory, a single program procedure is required to program the cells to the desired storing states. However, for programming the multi-level flash memory, many program procedures are required to program the cells to the desired threshold voltages and the desired storing states.

FIG. 2 schematically illustrates an approach of programming a triple-level flash memory. The triple-level flash memory is also referred as a TLC flash memory. In FIG. 2, three program procedures are performed to program the cell of the TLC flash memory to the storing state "100". Firstly, in the first program procedure, the cell is programmed to the threshold voltage near the storing state "111". Then, in the second program procedure, the cell is programmed to the threshold voltage near the storing state "101". Then, in the third program procedure, the cell is programmed to the threshold voltage corresponding to the storing state "100".

In other words, it is necessary to realize the final storing state of the TLC flash memory during the program cycle. For programming the cell of the triple-level flash memory to the storing state "011", the cell is programmed to the threshold voltage near the storing state "000" in the first program procedure, then the cell is programmed to the threshold voltage near the storing state "010" in the second program procedure, and finally the cell is programmed to the threshold voltage near the storing state "011" in the third program procedure. The ways of programming the triple-level flash memory to other storing states are similar, and are not redundantly described herein. Generally, for programming the multi-level flash memory, plural program procedures are required to sequentially change the threshold voltages of the cells. Consequently, the threshold voltages of the cells are programmed to be in the desired threshold voltage range.

As mentioned above, it is necessary to perform plural program procedures to program the cell to the desired threshold voltage during the program cycle of the multi-level flash memory. If the number of times of programming the cells does not reach a predetermined value, it means that the data to be stored into the cells are not completely stored into the cells. Under this circumstance, the data to be stored into the cells cannot be read out from the cells.

Generally, the flash memory comprises plural blocks. Each block contains plural pages. During the program cycle, data are written into at least one page of the flash memory. The size of the page is defined by the manufacturer of the flash memory. For example, the size of each page is 2K bytes, 4K bytes or 8K bytes. For example, the write data of the 4K-byte page containing user data, encoding data and associated data have a total of 4224 bytes ($=4224\times8$ bits).

In other words, a total of 4224×8 single-level cells of the single-level flash memory are required to store the data of a 4K-byte page. Since the data density of the double-level flash memory is higher, a total of 4224×8 double-level cells of the double-level flash memory can store two pages of data (=2×4224 bytes). Similarly, a total of 4224×8 triple-level cells of the triple-level flash memory can store three pages of data (=3×4224 bytes).

Moreover, each word line of the flash memory is connected with 4224×8 cells. Consequently, the 4224×8 cells can be programmed simultaneously. For example, in the triple-level flash memory, the cells connected to each word line can store three pages of data. Moreover, three program procedures are required to program the cells connected to each word line. However, in some kinds of multi-level flash memories, the cells connected to the same word line are not subjected to multiple consecutive program procedures during the program cycle of the multi-level flash memory. Hereinafter, a method of programming this multi-level flash memory will be described by taking a TLC flash memory as an example.

FIG. 3 is a schematic functional block diagram illustrating a conventional solid state storage device. As shown in FIG. 3, the solid state storage device 300 comprises a controller 301, a buffer 307 and a TLC flash memory 305. The controller 301 is connected with the buffer 307 and the TLC flash memory 305. Moreover, the controller 301 is connected with a host 320 through an external bus 310. Consequently, commands and data can be exchanged between the controller 301 and the host 320.

A process for writing host data from the host 320 to the TLC flash memory 305 will be illustrated as follows. Firstly, the controller 301 performs an error correction (ECC) encoding operation on the host data, encodes the host data into host write data, and stores the host write data into the buffer 307. Then, the controller 301 performs the program action at proper time in order to store the write data in the buffer 307 into the TLC flash memory 305. For example, the buffer 307 is a static random access memory (SRAM) or a dynamic random access memory (DRAM). When the supplied power is interrupted, the data temporarily stored in the buffer are not retained in the buffer 307. Generally, the external bus 310 is a USB bus, an IEEE 1394 bus, a PCIe bus, an SATA bus, or the like.

Moreover, according to the specifications of the multi-level flash memory, the program order of the TLC flash memory 305 can be determined. FIGS. 4A and 4B schematically illustrate the program order of the TLC flash memory. For example, the size of one page is 4K bytes. In addition, the write data of the 4K-byte page containing user data, encoding data and associated data have a total of 4224 bytes (=4224×8 bits).

Generally, the TLC flash memory 305 comprises plural blocks, and each block comprises plural pages. Moreover, three pages of host write data are stored in the cells corresponding to the same word line. In FIGS. 4A and 4B, an open block of the TLC flash memory 305 and the program procedures of the cells connected to the corresponding word lines are described. When the open block is full, the controller 301 sets the block as a closed block. Then, the controller 301 searches another blank block of the TLC flash memory 305 and sets the blank block as an open block. Then, the host write data are stored into the open block according to the similar program order.

Please refer to FIG. 4A again. After the host data with 12 pages are received by the solid state storage device 300 and the ECC decoding operation is performed on the host data, 12 pages A-L of host write data are generated and temporarily stored in the buffer 307 sequentially.

As mentioned above, the cells corresponding to each word line of the TLC flash memory 305 can store three pages of data. As shown in FIG. 4A, the host write data of the pages A, B and C are stored in the TLC cells corresponding to the first word line, the host write data of the pages D, E and F are stored in the TLC cells corresponding to the second word line, the host write data of the pages G, H and I are stored in the TLC cells corresponding to the third word line, and the write data of the pages J, K and L are stored in the TLC cells corresponding to the fourth word line.

According to the specifications, the program order of the TLC flash memory 305 is shown in FIG. 4B. Firstly, the controller 301 activates the first word line and performs a first program procedure (1st). Then, the controller 301 activates the second word line and performs a second program procedure (2nd). Then, the controller 301 activates the first word line and performs a third program procedure (3rd). Then, the controller 301 activates the third word line and performs a fourth program procedure (4th). Then, the controller 301 activates the second word line and performs a fifth program procedure (5th). Then, the controller 301 activates the first word line and performs a sixth program procedure (6th). Then, the controller 301 activates the fourth word line and performs a seventh program procedure (7th). Then, the controller 301 activates the third word line and performs an eighth program procedure (8th). Then, the controller 301 activates the second word line and performs a ninth program procedure (9th).

The program order of FIG. 4B complies with the following rules. In the TLC flash memory 305, the TLC cells corresponding to a specified word line are completely programmed after three program procedures are performed. As shown in FIG. 4B, the TLC cells corresponding to the first word line are subjected to the three program procedures after the sixth program procedure is performed by the controller 301. That is, after the first program procedure (1st), the third program procedure (3rd) and the sixth program procedure (6th) are performed, the three program procedures of the TLC cells corresponding to the first word line are completed. Consequently, the threshold voltages of the TLC cells corresponding to the first word line are in the desired threshold voltage ranges of the host write data of the pages A, B and C. Under this circumstance, the host write data of the pages A, B and C are stored in the TLC cells corresponding to the first word line.

That is, after the first program procedure (1st), the third program procedure (3rd) and the sixth program procedure (6th) are performed, the controller 301 confirms that the TLC cells corresponding to the first word line are completely programmed. Meanwhile, the host write data of the pages A, B and C are stored in the TLC cells corresponding to the first word line. Similarly, after the second program procedure (2nd), the fifth program procedure (5th) and the ninth program procedure (9th) are performed, the controller 301 confirms that the TLC cells corresponding to the second word line are completely programmed. Meanwhile, the host write data of the pages D, E and F are stored in the TLC cells corresponding to the second word line.

If no new host data are provided by the host 320 after the ninth program procedure (9th), it means that no new write data are added to the buffer 307 to be stored into the TLC cells corresponding to the fifth word line of the TLC flash memory 305. Due to the limitation of the program order of the TLC flash memory 305, the controller 301 cannot perform the subsequent program procedures on the TLC cells of the third word line and the TLC cells of the fourth bit line because the controller 301 cannot perform the program procedure on the TLC cells of the fifth word line. In the TLC flash memory 305, the TLC cells corresponding to the third word line are only subjected to two program procedures, and the TLC cells corresponding to the fourth word line are subjected to only one program procedure. Consequently, the TLC cells corresponding to the third word line and the TLC cells corresponding to the fourth word line are not completely programmed. Therefore, the host write data of the pages G-L are not completely stored in the TLC cells corresponding to the third word line and the fourth word line.

After new host data from the host 320 are converted into the host write data and stored into the buffer 307, the controller 301 performs associated control operation again according to the program order. Consequently, the TLC cells corresponding to the third word line and the TLC cells corresponding to the fourth word line are sequentially programmed. That is, after an additional program procedure is performed, the TLC cells corresponding to the third word line are completely programmed. Moreover, after two additional program procedures are performed, the TLC cells corresponding to the fourth word line are completely programmed.

Generally, after the TLC cells corresponding to a specified word line are completely programmed (i.e., subjected to three program procedures), the controller 301 can perform an error correction (ECC) encoding operation to accurately read the stored data. Whereas, if the TLC cells corresponding to the specified word line are not completely programmed (i.e., not subjected to three program procedures), the desired threshold voltages of the TLC cells are not achieved. Under this circumstance, the stored data cannot be accurately read from the TLC cells through the ECC encoding operation of the controller 301. For example, if the TLC cells corresponding to the third word line are not completely programmed, the stored host write data corresponding to the pages G, H and I cannot be accurately read from the TLC cells through the ECC encoding operation of the controller 301.

As mentioned above, the TLC cells corresponding to the third word line and the fourth word line as shown in FIG. 4B are not completely programmed. After the other new host write data from the host 320 are provided, the controller 301 continuously performs associated control operation according to the program order of the TLC flash memory 305. That is, after the TLC cells corresponding to the third word line and the TLC cells corresponding to the fourth word line are completely programmed, the corresponding stored data can be accurately read.

When a flush command is transmitted from the host 320 to the solid state storage device 300, the controller 301 has to confirm that all of the temporarily-stored host write data in the buffer 307 have been completely stored in the TLC flash memory 305. That is, the controller 301 has to confirm that all of the cells storing the host write data from the buffer 307 have been completely programmed. Then, the data temporarily stored in the buffer 307 are cleared by the controller 301.

As shown in FIG. 4B, if no new host data is transmitted from the host 320, and when the flush command from the host 320 is received by the solid state storage device 300, the controller 301 will self-generate redundant write data, temporarily store the redundant write data into the buffer 307 and perform the program procedures to store the write data from the buffer 307 to the TLC flash memory 305. Consequently, the host write data of the pages G-L in the buffer 307 can be completely stored into the TLC cells corresponding to the third word line and the fourth word line.

FIG. 5A is a flowchart illustrating a data writing method for a conventional solid state storage device. This flowchart describes the action of the solid state storage device 300 in response to a flush command. Normally, in response to a write command from the host 320, the controller 301 receives the host data, converts the host data into the host write data, and temporarily stores the host write data into the buffer 307.

In the step S502, the flush command from the host 320 is received by the controller 301. In order to store the temporarily-stored host write data in the buffer 307 into the TLC flash memory 305, the controller 301 generates redundant write data and temporarily stores the redundant write data into the buffer (Step S504). Then, during a program cycle, the write data in the buffer are stored into the open block of the TLC flash memory 305 according to the program order by the controller 301 (Step S506).

FIGS. 5B and 5C schematically illustrate the program order of the conventional solid state storage device in response to the flush command. The storing condition of the flash memory 305 is similar to that of FIG. 4B. In the situation of FIG. 4B, the flush command from the host 320 is received by the solid state storage device 300.

Please refer to FIGS. 5A and 5B. In order to store the temporarily-stored host write data in the buffer 307 into the TLC flash memory 305, the controller 301 generates six pages of redundant write data Ra~Rf and temporarily stores the redundant write data into the buffer 307.

Please refer to FIG. 5C. Then, the controller 301 performs the program action. Consequently, the write data in the buffer 307 are stored into the TLC flash memory 305 according to the program order.

That is, the controller 301 activates the fifth word line and performs a tenth program procedure (10th). Then, the controller 301 activates the fourth word line and performs an eleventh program procedure (11th). Then, the controller 301 activates the third word line and performs a twelfth program procedure (12th). Then, the controller 301 activates the sixth word line and performs a thirteenth program procedure (13th). Then, the controller 301 activates the fifth word line and performs a fourteenth program procedure (14th). Then, the controller 301 activates the fourth word line and performs a fifteenth program procedure (15th).

Obviously, after the fifteenth program procedure (15th), the TLC cells corresponding to the third word line and the TLC cells corresponding to the fourth word line have been completely programmed. That is, when the flush command is received by the conventional solid state storage device, the controller 301 generates and temporarily stores the redundant write data into the buffer 307. Then, the controller 301 performs the program action to store the write data in the buffer 307 into the open block of the TLC flash memory 305 according to the program order.

As mentioned above, when the flush command from the host 320 is received by the solid state storage device 300, the controller 301 has to generate the redundant write data and temporarily store redundant write data into the buffer 307. If the host 320 continuously issues the flush command during the process of transmitting the host data, the controller 301 has to generate the redundant write data, temporarily store redundant write data into the buffer 307 and store the redundant write data into the TLC flash memory 305. FIG. 6 schematically illustrates the data storage conditions in the flash memory of the conventional solid state storage device.

As shown in FIG. 6, the host 320 continuously issues the flush command during the process of transmitting the host data. Consequently, the host write data (Ho) and the redundant write data (R) are alternately stored in the open block of the TLC flash memory 305.

As known, the redundant write data (R) are invalid data. If the host 320 continuously issues the flush command during the process of transmitting the host data, the number of the invalid data stored in the TLC flash memory 305 gradually increases. Under this circumstance, the utilization efficiency of the solid state storage device 300 decreases.

SUMMARY OF THE INVENTION

An embodiment of the present invention provides a data writing method for a solid state storage device. The solid state storage device includes a flash memory with plural blocks. The data writing method includes the following steps. Firstly, a flush command is received. Then, host write data in a buffer are stored into an open block of the flash memory according to a program order. Then, a garbage collection is performed to acquire collected write data from a close block of the flash memory and temporarily store the collected write data into the buffer. Then, the host write data and the collected write data in the buffer are stored into the open block of the flash memory according to the program order.

Another embodiment of the present invention provides a solid state storage device. The solid state storage device is connected with a host. The solid state storage device includes a buffer, a controller and a flash memory. The controller is connected with the host and the buffer. The controller receives host data from the host, converts the host data into host write data, and temporarily stores the host write data into the buffer. The flash memory is connected with the controller. When a flush command from the host is received, the controller stores the host write data into an open block of the flash memory according to a program order, the controller performs a garbage collection to acquire collected write data from a close block of the flash memory and temporarily store the collected write data into the buffer, and the controller stores the host write data or the collected write data in the buffer into the open block of the flash memory according to the program order.

Another embodiment of the present invention provides a data writing method for a solid state storage device. The solid state storage device comprises a flash memory with plural blocks. The data writing method comprises steps of: in response to a write command, receiving host data from a host, converting the host data into host write data, and temporarily storing the host write data into a buffer; receiving a flush command; performing a garbage collection to acquire collected write data from a close block of the flash memory and temporarily store the collected write data into the buffer; and storing host write data and the collected write data in the buffer into the open block of the flash memory according to a program order.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention provides a solid state storage device and a data writing method in response to a flush command.

Figure 7:
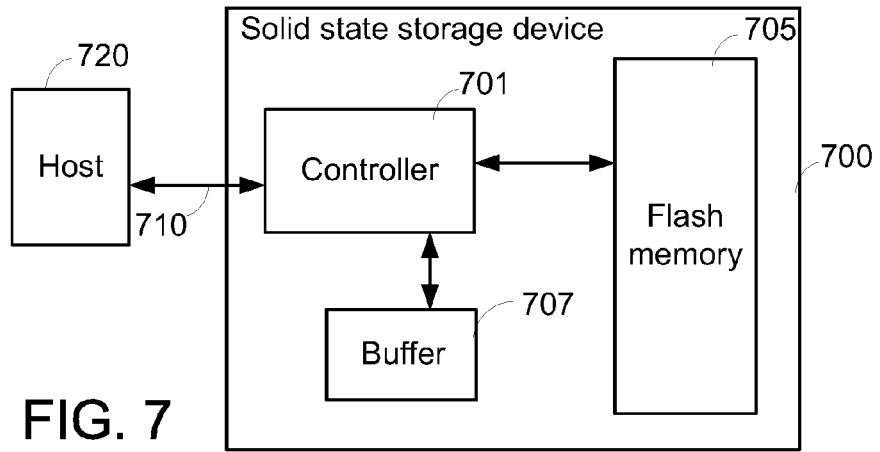
FIG. 7 is a schematic functional block diagram illustrating a solid state storage device according to an embodiment of the present invention.

FIG. 7 is a schematic functional block diagram illustrating a solid state storage device according to an embodiment of the present invention. As shown in FIG. 7, the solid state storage device 700 comprises a controller 701, a buffer 707 and a flash memory 705. The controller 701 is connected with a host 720 through an external bus 710. In accordance with the present invention, the controller 701 cannot perform multiple consecutive program procedures on the same cells of the flash memory 705. In an embodiment, the flash memory 705 is a multi-level flash memory with a special program order.

A process of writing host data from the host 720 to the flash memory 705 will be illustrated as follows. Firstly, the controller 701 performs an error correction (ECC) encoding operation on the host data, encodes the host data into host write data, and stores the write data into the buffer 707. Then, the controller 701 performs the program action at proper time in order to store the write data in the buffer 707 into the flash memory 705. For example, the buffer 707 is a static random access memory (SRAM) or a dynamic random access memory (DRAM). When the supplied power is interrupted, the data temporarily stored in the buffer are not retained in the buffer 707. Generally, the external bus 710 is a USB bus, an IEEE 1394 bus, a PCIe bus, an SATA bus, or the like.

Moreover, the solid state storage device 700 can perform a garbage collection. A method for performing the garbage collection will be described as follows.

Generally, the flash memory 705 comprises plural blocks. Each block comprises plural pages, for example 64 pages. Each page is typically 4K bytes in size. Due to the inherent properties of the flash memory, at least one page is written during the program action, and the erase operation is performed in a block-wise fashion.

Moreover, if the data of a specified page in a block of the flash memory intends to be updated, the controller 701 cannot directly update the data of the specified page because of the inherent properties of the flash memory. Generally, the updated data is stored into a blank page of an open block by the controller 701. Then, the old page storing the original data is set as an invalid page, and the data in the invalid page is set as an invalid data.

However, after the flash memory 705 has been accessed many times by the host 720, the close block of the flash memory 705 storing the data contains many invalid page and many invalid data. Consequently, the writable space of the flash memory 705 gradually decreases. Moreover, the close block contains the invalid pages and the valid pages. The valid pages store valid data.

The garbage collection is a process of collecting valid data of the close block and storing the valid data into another open block by the controller 701. After the valid data in the valid pages of the close block are collected and stored into another open block, the valid pages of the close block are changed into the invalid pages. When all of the pages of the close block are changed into the invalid pages, it means that the valid data in the valid pages of the close block are copied to other blocks. Then, the close block is erased as a blank block by the controller 701. Consequently, the writable space of the flash memory 705 is released.

For performing the garbage collection, the controller 701 firstly collects the valid data in the valid pages of the close block for being copied to other block, and the collected write data are temporarily stored in the buffer 707. Then, the controller 701 performs the program action at proper time in order to store the collected write data in the buffer 707 into the flash memory 705. Meanwhile, one garbage collection is completed.

That is, while the garbage collection is performed by the controller 701, the collected write data temporarily stored in the buffer 707 are all valid data.

Especially, the data writing method of the present invention further comprises a step of performing the garbage collection.

Figure 8A:
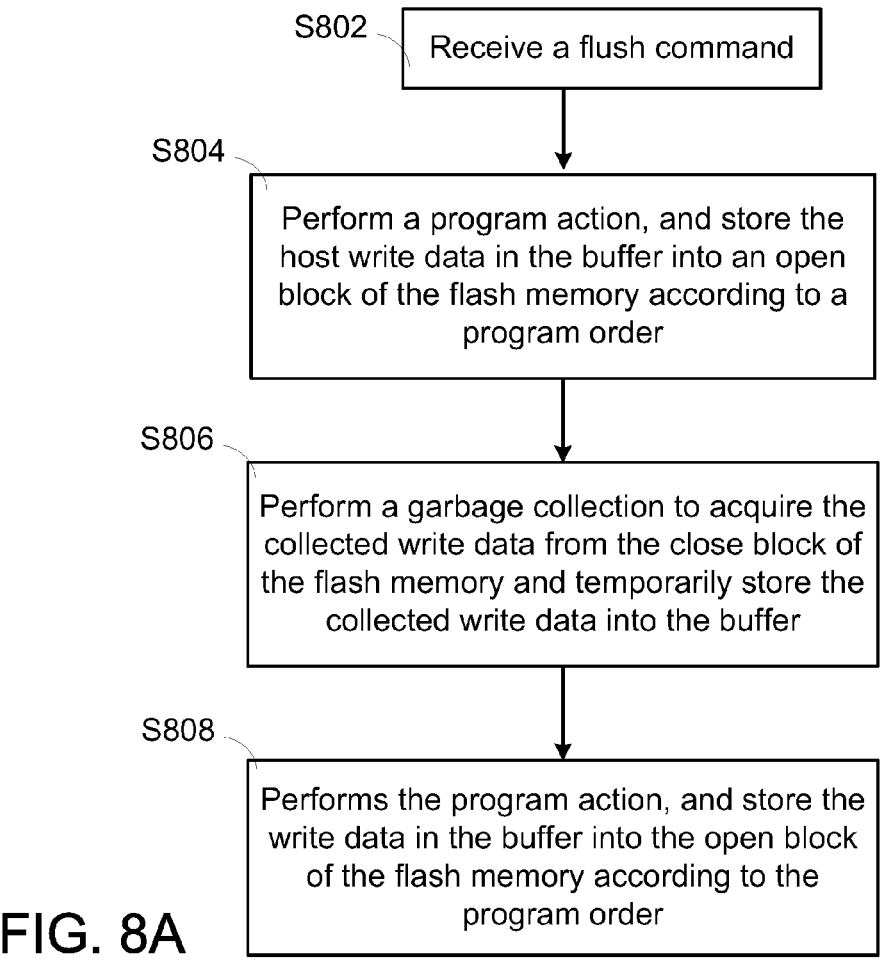
FIG. 8A is a flowchart illustrating a data writing method for a solid state storage device according to an embodiment of the present invention.

FIG. 8A is a flowchart illustrating a data writing method for a solid state storage device according to an embodiment of the present invention. This flowchart illustrates the actions of the solid state storage device 700 after a flush command is received. Normally, in response to a write command from the host 720, the controller 701 receives the host data, converts the host data into host write data, and temporarily stores the host write data into the buffer 707.

After the flush command from the host 720 is received (Step S802), the controller 701 performs a program action. In the program action, the host write data temporarily stored in the buffer 707 are stored into an open block of the flash memory 705 according to a program order (Step S804). That is, the host write data temporarily stored in the buffer 707 are stored into the cells of the corresponding word lines. It is noted that the cells corresponding to some word lines are not completely programmed after the step S804. Then, the controller 701 performs a garbage collection to acquire the collected write data from the close block of the flash memory 705 and temporarily store the collected write data into the buffer 707 (Step S806). Then, the controller 701 performs the program action. Consequently, the write data temporarily stored in the buffer 707 are stored into the open block of the flash memory 705 according to the program order (Step S808).

In the step S808, the write data in the buffer 707 to be stored into the flash memory 705 are the host write data or the collected write data. All of the host write data and the collected write data are valid data.

Figure 1A:
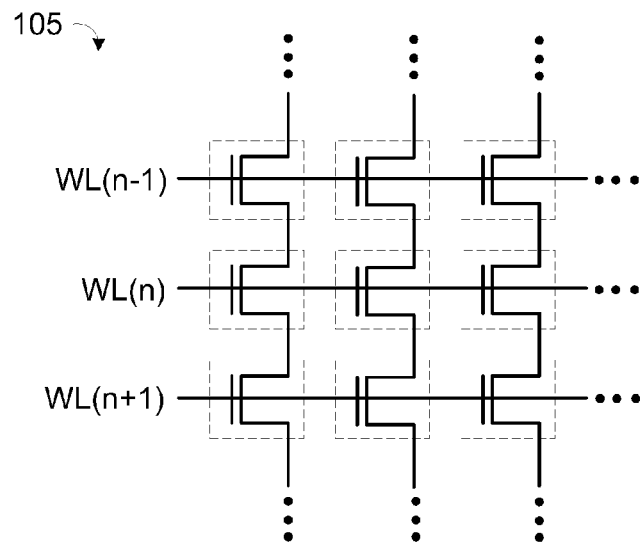
FIG. 1A (prior art) schematically illustrates the architecture of cells in the flash memory of a solid state storage device.
Figure 1B:
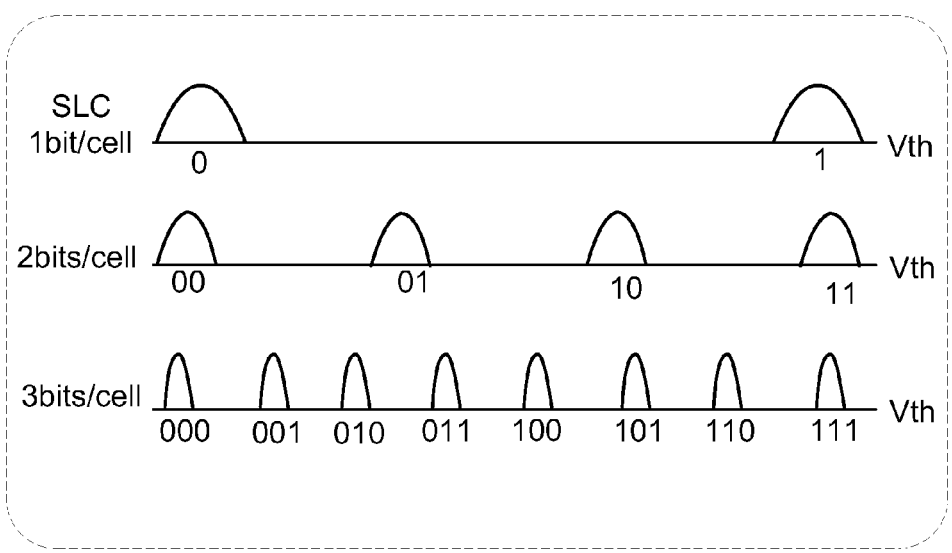
FIG. 1B (prior art) schematically illustrates the threshold voltage distribution curves of the various flash memories in different storing states.
Figure 2:
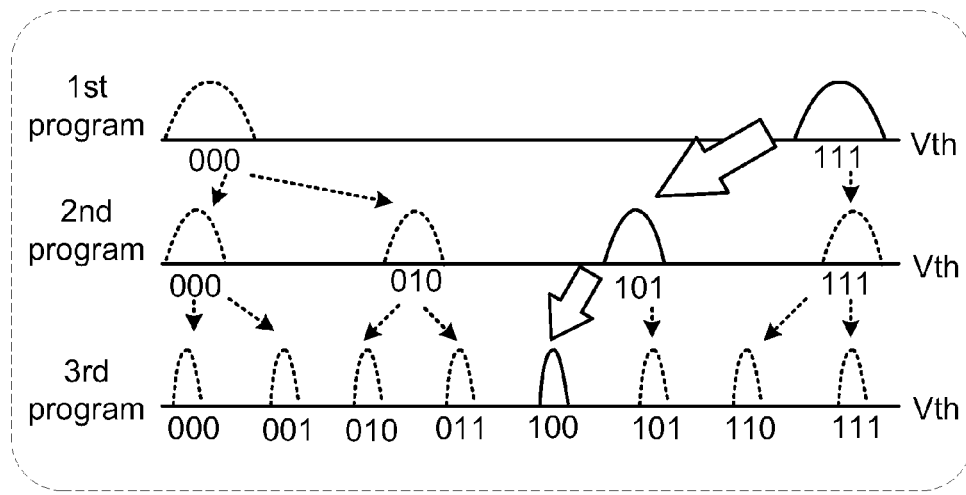
FIG. 2 (prior art) schematically illustrates an approach of programming a triple-level flash memory.
Figure 3:
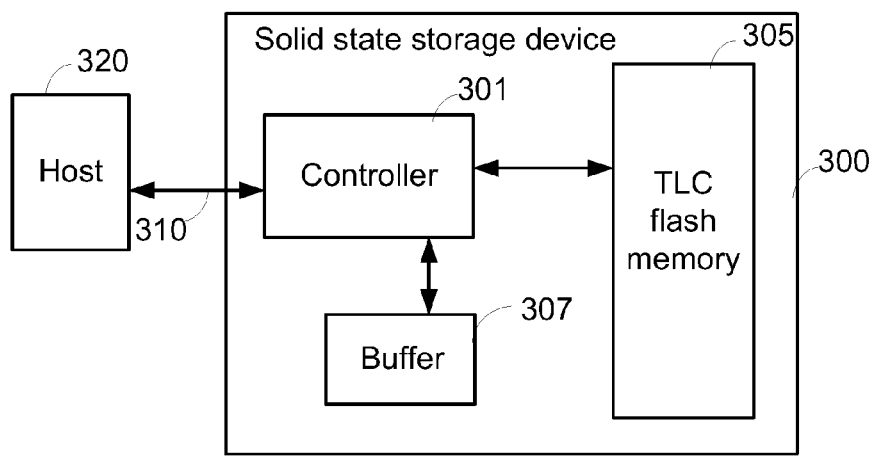
FIG. 3 (prior art) is a schematic functional block diagram illustrating a conventional solid state storage device.
Figure 4A:
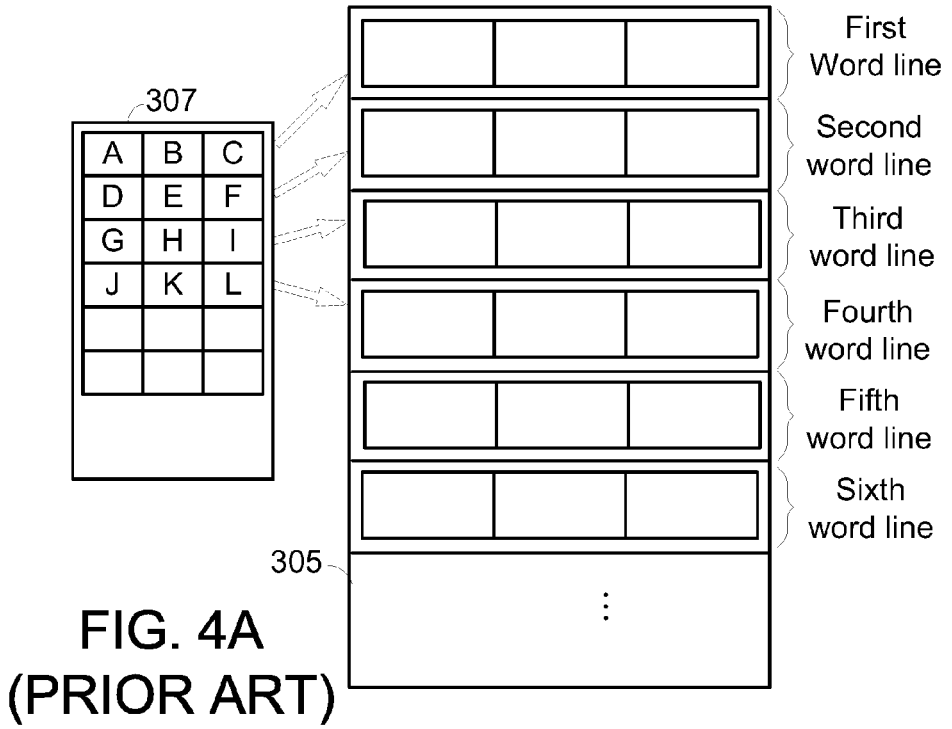
FIGS. 4A and 4B (prior art) schematically illustrate the program order of the TLC flash memory.
Figure 4B:
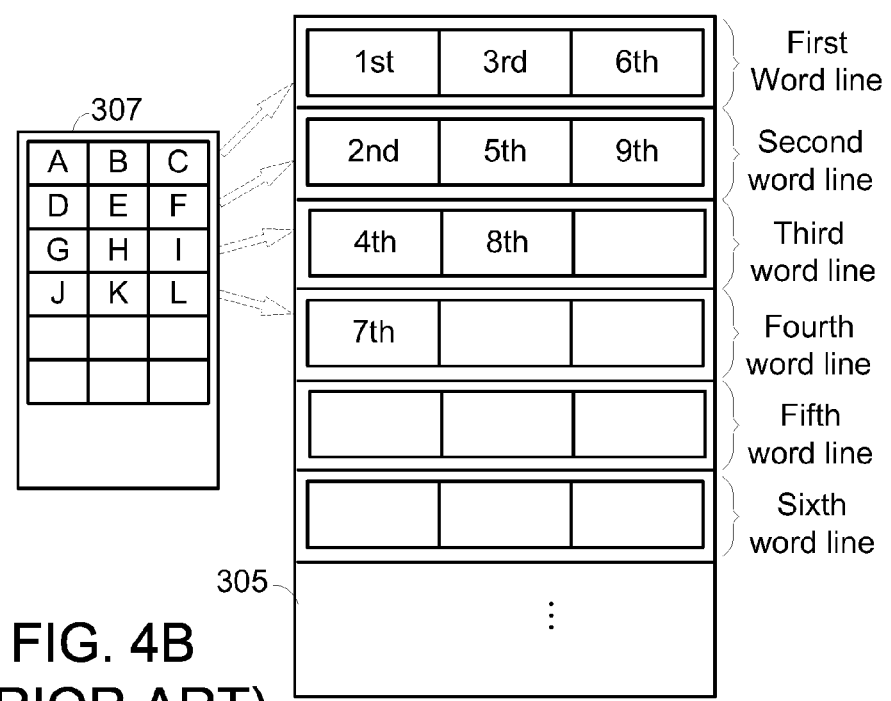
Figure 5A:
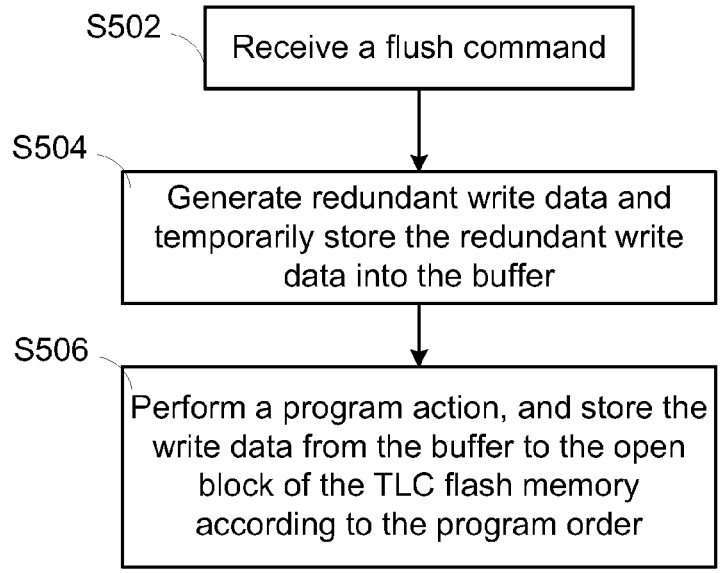
FIG. 5A (prior art) is a flowchart illustrating a data writing method for a conventional solid state storage device.
Figure 5B:
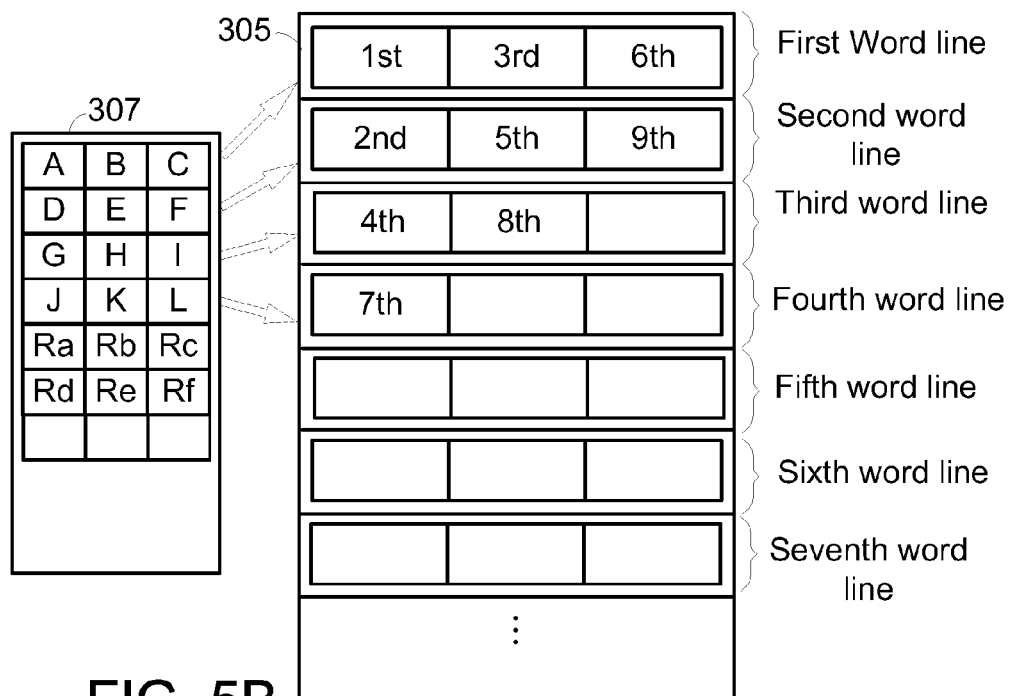
FIGS. 5B and 5C (prior art) schematically illustrate the program order of the conventional solid state storage device in response to the flush command.
Figure 5C:
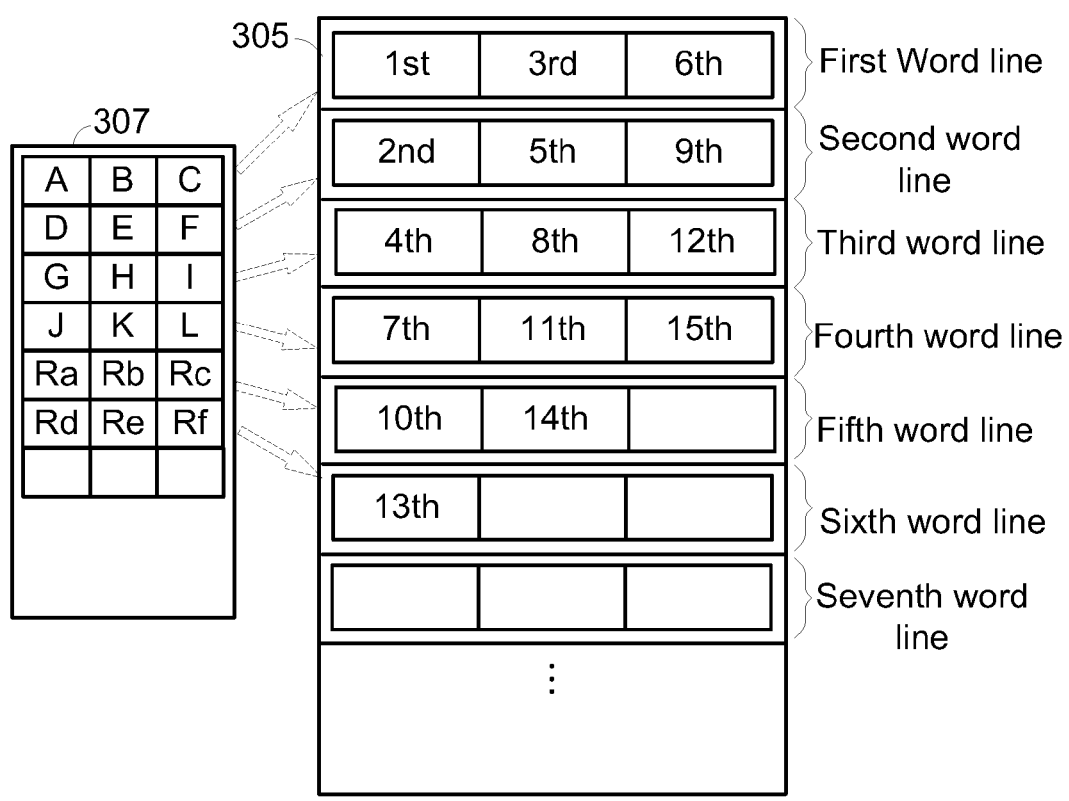
Figure 6:
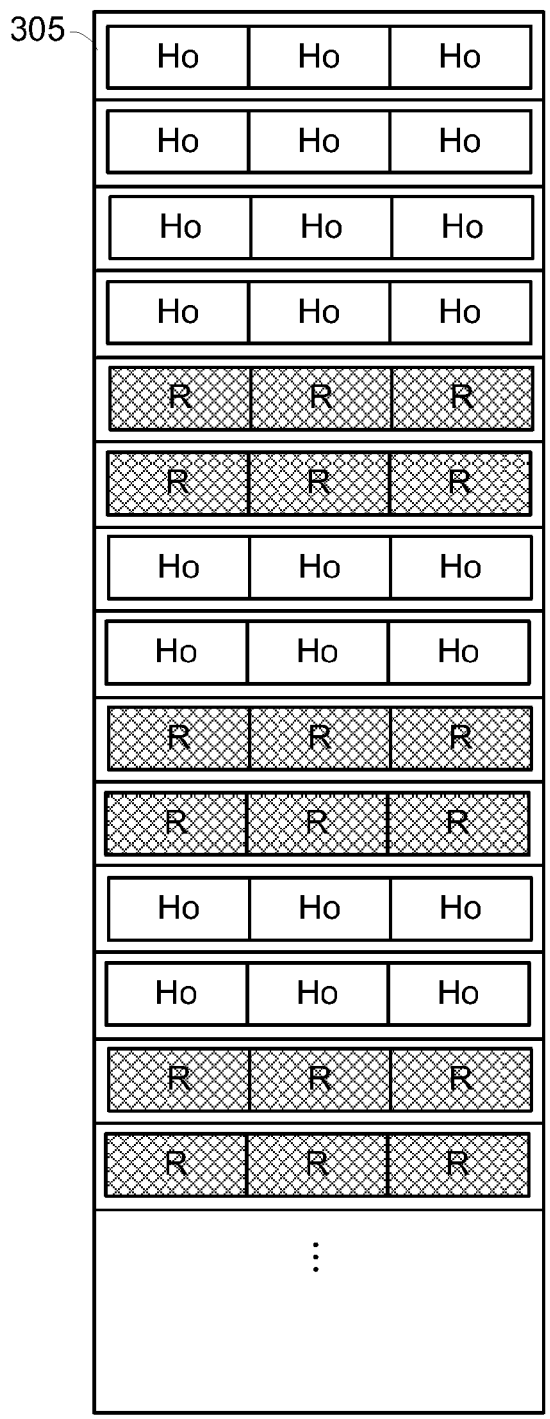
FIG. 6 (prior art) schematically illustrates the data storage conditions in the flash memory of the conventional solid state storage device.
Figure 8B:
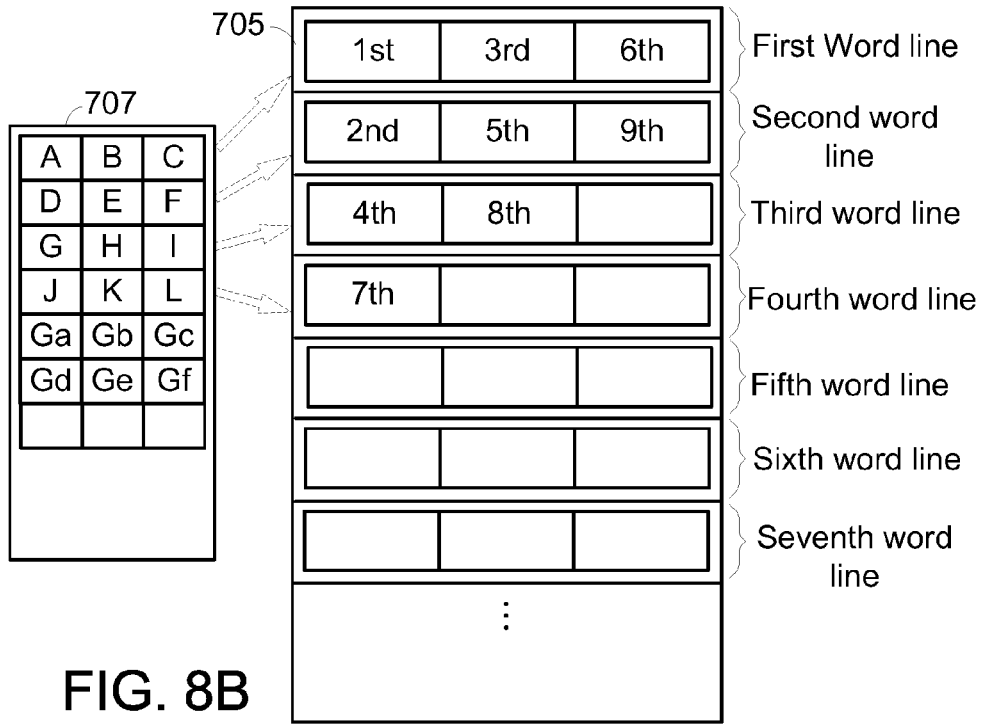
FIGS. 8B and 8C schematically illustrate the program order of the solid state storage device in response to the flush command according to the embodiment of the present invention.
Figure 8C:
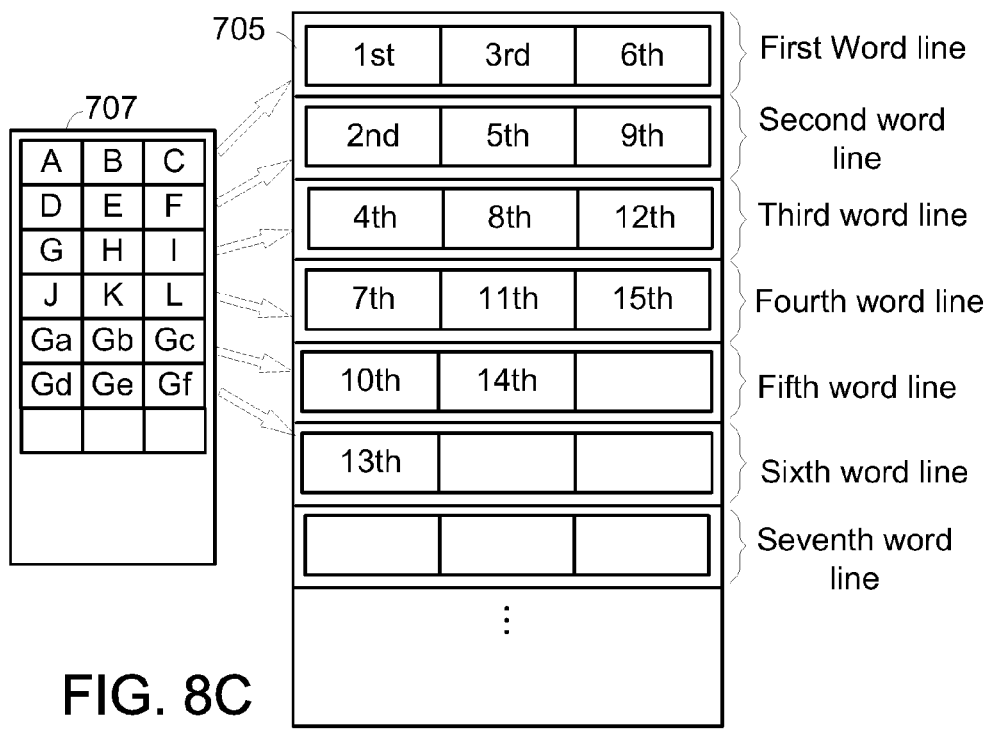

FIGS. 8B and 8C schematically illustrate the program order of the solid state storage device in response to the flush command according to the embodiment of the present invention. The flash memory 705 is a TLC flash memory, and the storing condition of the flash memory 705 is similar to that of FIG. 4A. In the situation of FIG. 4A, the flush command from the host 720 is received by the solid state storage device 700.

Please also refer to FIG. 8A. In order to store the temporarily-stored host write data in the buffer 707 into the flash memory 705, the controller 701 performs the program action. In the program action, the host write data in the buffer 707 are stored into the open block of the flash memory 705 according to the program order. That is, the host write data temporarily stored in the buffer 707 are stored into the TLC cells of the corresponding word lines by the controller 701. After the program action is performed by the controller, the TLC cells corresponding to the third word line and the TLC cells corresponding to the fourth word line are not completely programmed. Then, the controller 701 performs a garbage collection to acquire the collected write data from the close block of the flash memory 705 and temporarily store the collected write data into the buffer 707. After the garbage collection is performed, the storage condition of the flash memory 705 is similar to that shown in FIG. 8B. For example, at least six pages of collected write data Ga~Gf are acquired and temporarily stored in the buffer 707 by the controller 701. The collected write data of the pages Ga~Gc are stored in the TLC cells corresponding to the fifth word line. The collected write data of the pages Gd~Gf are stored in the TLC cells corresponding to the sixth word line.

Then, the controller 701 performs the program action. Consequently, the write data temporarily stored in the buffer 707 are stored into the open block of the flash memory 705 according to the program order. After the program action, the storage condition of the flash memory 705 is similar to that shown in FIG. 8C.

That is, the controller 701 activates the fifth word line and performs a tenth program procedure (10th). Then, the controller 701 activates the fourth word line and performs an eleventh program procedure (11th). Then, the controller 701 activates the third word line and performs a twelfth program procedure (12th). Then, the controller 701 activates the sixth word line and performs a thirteenth program procedure (13th). Then, the controller 701 activates the fifth word line and performs a fourteenth program procedure (14th). Then, the controller 701 activates the fourth word line and performs a fifteenth program procedure (15th).

Obviously, after the fifteenth program procedure (15th), the TLC cells corresponding to the third word line and the TLC cells corresponding to the fourth word line are completely programmed. In other words, the host write data of the pages G-L in the buffer 707 are completely stored into the TLC cells corresponding to the third word line and the fourth word line. Moreover, the write data stored in the open block of the flash memory 705 are all valid data.

That is, when the flush command is received by the solid state storage device 700, the controller 701 performs the program action to store the temporarily-stored host write data in the buffer 707 into the open block of the flash memory 705 according to program order. Then, the controller 701 performs the garbage collection to acquire the collected write data. After the garbage collection is performed, the host write data and the collected write data in the buffer 707 are stored into the open block of the flash memory 705 according to the program order. Consequently, the cells connected to the corresponding word lines for storing the temporarily-stored host write data of the buffer 707 are completely programmed. Since all of the collected write data acquired by the controller 701 are valid data, the write data stored in the open block of the flash memory 705 are valid data certainly.

If the host 720 continuously issues the flush command during the process of transmitting the host data, the controller 701 performs the garbage collection multiple times to acquire the collected write data. Moreover, the collected write data and the host write data are collaboratively programmed into the flash memory 705.

Figure 9:
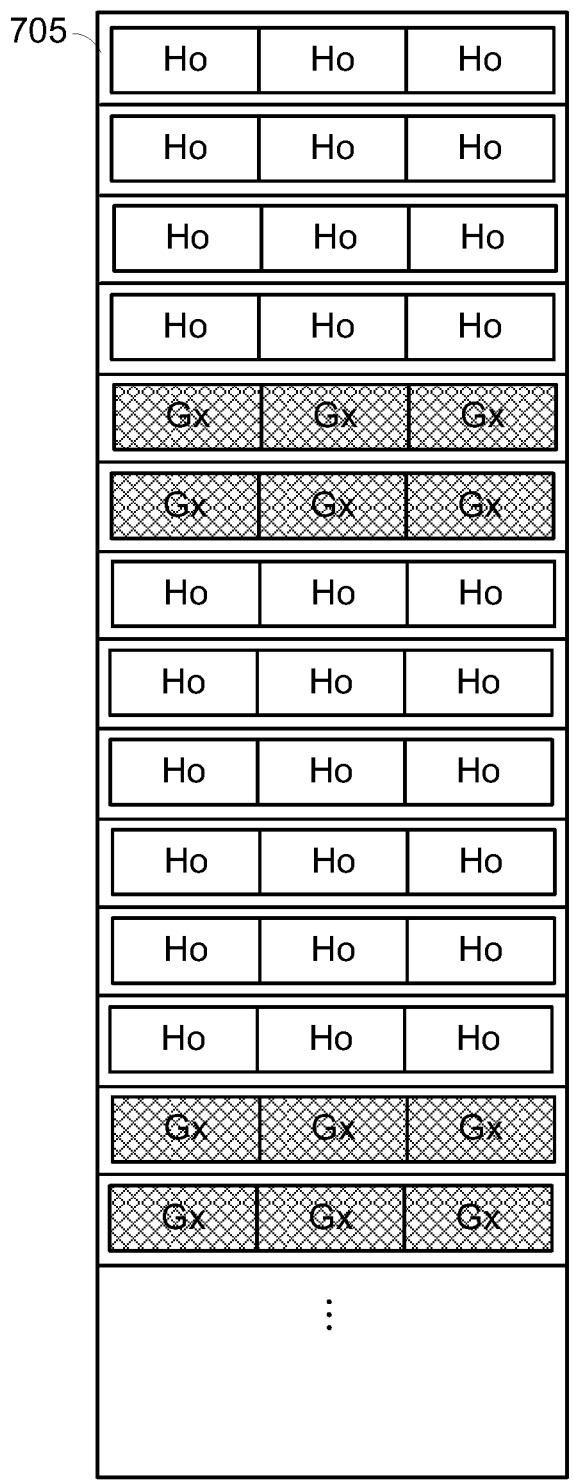
FIG. 9 schematically illustrates the data storage conditions in the flash memory of the solid state storage device according to an embodiment of the present invention.

FIG. 9 schematically illustrates the data storage conditions in the flash memory of the solid state storage device according to an embodiment of the present invention. As shown in FIG. 9, the host write data (Ho) and the collected write data (Gx) are alternately stored in the open block of the flash memory 705. Especially, the host write data (Ho) and the collected write data (Gx) are all valid data.

Moreover, after the flush command is received by the solid state storage device 700, the controller 701 performs the garbage collection according to a predetermined data amount in order to acquire the collected write data. That is, the controller 701 performs the garbage collection until the amount of the collected write data reaches the predetermined data amount. Moreover, the collected write data are temporarily stored in the buffer 707.

Generally, the predetermined data amount is the additional data amount for allowing the temporarily-stored host write data in the buffer 707 to be completely stored into the flash memory 705. That is, the predetermined data amount is the additional data amount for allowing the cells storing the host write data of the buffer 707 to be completely programmed.

Take the TLC flash memory as an example. For storing the host write data from the buffer 707 to the flash memory 705, the controller 701 needs to additionally provide at least six pages of data. In the example of FIG. 8B, the predetermined data amount is equal to six-page data amount. After the six pages of collected write data Ga~Gf are acquired and temporarily stored into the buffer 707 by the controller 701, the host write data and the collected write data Ga~Gf in the buffer 707 are collaboratively programmed into the flash memory 705. Consequently, the host write data can be stored into the TLC cells corresponding to the third word line and the fourth word line of the flash memory 705.

In another embodiment, when the flush command is received by the solid state storage device 700, the controller 701 can firstly performs the garbage collection to acquire the collected write data according to the predetermined data amount. After the garbage collection is performed, the host write data and the collected write data in the buffer 707 are stored into the open block of the flash memory 705 according to the program order.

In some embodiments, the data writing method is modified to increase the stability of storing data into the cells. For example, if the cells corresponding to a next word line are completely programmed, the stability of storing data into the cells corresponding to the current word line is increased. As shown in FIG. 8C, the TLC cells corresponding to the fourth word line and storing the host write data J~L are completely programmed. For increasing the stability of storing the host write data J~L into the TLC cells corresponding to the fourth word line, the TLC cells corresponding to the fifth word line are further completely programmed by the controller 701. That is, an additional word line corresponding to the completely programmed TLC cells is required. In the example of FIG. 8B, the controller 701 needs to additionally provide at least nine pages of data (i.e., the predetermined data amount is equal to nine-page data amount). Under this circumstance, an additional word line corresponding to the completely programmed TLC cells is provided, that means the TLC cells corresponding to the fifth word line are completely programmed. After the TLC cells corresponding to the fifth word line are completely programmed, the data stability of the TLC cells corresponding to the fourth word line is enhanced.

It is noted that the predetermined data amount and the number of the additional word lines corresponding to the completely programmed TLC cells are not restricted. The number of the additional word lines corresponding to the completely programmed TLC cells is determined according to the required data stability, and the predetermined data amount is correspondingly determined.

As mentioned above, after the controller 701 performs the garbage collection in response to the flush command, the host write data and the collected write data in the buffer 707 are sequentially stored into the open block of the flash memory according to the program order. Generally, the subsequent process can be determined according to the result of judging whether a residual storage space of the open block is larger than or smaller than the data amount of the collected write data. The residual storage space of the open block is an estimated residual storage space of the open block considering if the host write data in the buffer 707 are stored into the open block. If the residual storage space of the open block is larger than the data amount of the collected write data, the method of FIG. 8A is adopted. That is, the temporarily-stored write data in the buffer 707 are stored into the open block of the flash memory 705. After the controller 701 confirms that the host write data have been completely store into the flash memory 705, it means that all of the cells storing the host write data have been completely programmed. Then, the controller 701 clears the data in the buffer 707 and responds to the host 720 that the flush command has been executed.

If the residual storage space of the open block is smaller than the data amount of the collected write data, it means that the open block is nearly full. In this situation, the controller 701 stores the write data in the buffer 707 into the open block of the flash memory 705 until the open block is full. Then, the controller 701 performs a block close action and stops storing the collected write data into the flash memory. After the controller 701 confirms that the open block is changed to the close block, the controller 701 clears the data in the buffer 707 and responds to the host 720 that the flush command has been executed.

As mentioned above, the data amount of the collected write data can be determined according to the predetermined data amount. In some embodiments, the controller 701 determines the timing of clearing the data in the buffer 707 and responding to the host 720 according to the predetermined data amount and the residual storage space of the open block.

In some embodiments, the controller 701 performs a first stage of the garage collection after the host write data in the buffer 707 are stored into the open block of the flash memory 705 according to the program order. Consequently, first portions of the collected write data are acquired. After the write data are stored into the open block of the flash memory 705 according to the program order, the controller 701 performs a second stage of the garage collection to acquire second portions of the collected write data. Then, the write data are stored into the open block of the flash memory 705 according to the program order. After the controller 701 confirms that the host write data are completely stored into the flash memory 705, the controller 701 clears the data in the buffer 707 and responds to the host 720 that the flush command has been executed. That is, the controller 701 performs the garbage collection in multiple stages, and the collected write data acquired in the individual stages of the garbage collection are individually stored into the flash memory 705 according to the program order. Similarly, the controller 701 determines the timing of clearing the data in the buffer 707 and responding to the host 720 according to the predetermined data amount and the residual storage space of the open block.

From the above descriptions, the present invention provides a solid state storage device and a data writing method for the solid state storage device. The collected write data are valid data. When the flush command is received by the solid state storage device, the controller performs the garbage collection to acquire the collected write data. The collected write data can replace the redundant write data of the conventional technology. Since the collected write data and the host write data are collaboratively programmed into the flash memory, the storage space of the flash memory can be effectively used to store data. Consequently, the utilization efficiency of the solid state storage device is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A data writing method for a solid state storage device, the solid state storage device comprising a flash memory with plural blocks, the data writing method comprising steps of:
   receiving a flush command;
   storing host write data in a buffer into an open block of the flash memory according to a program order;
   performing a garbage collection to acquire collected write data from a close block of the flash memory and temporarily store the collected write data into the buffer; and
   storing host write data and the collected write data in the buffer into the open block of the flash memory according to the program order,
   wherein, if a residual storage space of the open block is smaller than a predetermined data amount, the residual storage space of the open block is an estimated residual storage space of the open block considering if the host write data in the buffer are stored into the open block, the data writing method further comprises steps of:
   storing the host write data and the collected write data into the open block of the flash memory until the open block is full;
   performing a block close action and stopping writing the collected write data into the flash memory; and clearing the data that are temporarily stored in the buffer.

2. The data writing method as claimed in claim 1, wherein in response to a write command, the solid state storage device receives host data from a host, converts the host data into the host write data, and temporarily stores the host write data into the buffer.

3. The data writing method as claimed in claim 1, wherein the host write data and the collected write data are all valid data.

4. The data writing method as claimed in claim 1, further comprising steps of:
   judging whether the host write data have been completely stored into the flash memory; and
   if the solid state storage device confirms that the host write data have been completely stored into the flash memory, clearing the data that are temporarily stored in the buffer.

5. The data writing method as claimed in claim 4, wherein the flash memory further comprises plural word lines, wherein after a specified number of program procedures are performed on a specified word line, the host write data for being store to the specified word line are completely stored.

6. The data writing method as claimed in claim 1, wherein the flash memory further comprises plural word lines, and each of the plural word lines is connected with plural cells, wherein after a specified number of program procedures are performed, the host write data are stored into the cells corresponding to a specified word line and the cells corresponding to the specified word line are completely programmed, wherein when the flush command is received, the garbage collection is performed according to the predetermined data amount, wherein the predetermined data amount is determined to allow the cells storing the host write data to be completely programmed according to the program order.

7. The data writing method as claimed in claim 1, wherein the garbage collection is performed according to the predetermined data amount, wherein the predetermined data amount is determined to allow the host write data to be completely stored into the flash memory according to the program order.

8. A solid state storage device connected with a host, the solid state storage device comprising:
   a buffer;
   a controller connected with the host and the buffer, wherein the controller receives host data from the host, converts the host data into host write data, and temporarily stores the host write data into the buffer; and
   a flash memory connected with the controller,
   wherein when a flush command from the host is received, the controller stores the host write data into an open block of the flash memory according to a program order, the controller performs a garbage collection to acquire collected write data from a close block of the flash memory and temporarily store the collected write data into the buffer, and the controller stores the host write data or the collected write data in the buffer to be stored into the open block of the flash memory according to the program order,
   wherein if a residual storage space of the open block is smaller than a predetermined data amount, the controller stores the host write data and the collected write data into the open block of the flash memory until the open block is full, and the controller performs a block close action, stops storing the collected write data into the flash memory, and clears the data that are temporarily stored in the buffer, wherein the residual storage space of the open block is an estimated residual storage space of the open block considering if the host write data in the buffer are stored into the open block.

9. The solid state storage device as claimed in claim 8, wherein if the controller confirms that the host write data have been completely stored into the flash memory after the flush command from the host is received, the data temporarily stored in the buffer are cleared.

10. The solid state storage device as claimed in claim 9, wherein the flash memory further comprises plural word lines, wherein after a specified number of program procedures are performed on a specified word line, the host write data for being store to the specified word line are completely stored.

11. The solid state storage device as claimed in claim 8, wherein the controller performs the garbage collection according to the predetermined data amount, wherein the predetermined data amount is determined to allow the host write data to be completely stored into the flash memory according to the program order.

12. The solid state storage device as claimed in claim 8, wherein the flash memory further comprises plural word lines, and each of the plural word lines is connected with plural cells, wherein after a specified number of program procedures are performed, the host write data are stored into the cells corresponding to a specified word line and the cells corresponding to the specified word line are completely programmed, wherein after the flush command is received, the garbage collection is performed according to the predetermined data amount, wherein the predetermined data amount allows the cells storing the host write data to be completely programmed according to the program order.

13. A data writing method for a solid state storage device, the solid state storage device comprising a flash memory with plural blocks, the data writing method comprising steps of:
   in response to a write command, receiving host data from a host, converting the host data into host write data, and temporarily storing the host write data into a buffer;
   receiving a flush command;
   performing a garbage collection, in response to the flush command, to acquire collected write data from a close block of the flash memory and temporarily store the collected write data into the buffer; and
   storing host write data and the collected write data in the buffer into the open block of the flash memory according to a program order;
   if a residual storage space of the open block is smaller than a predetermined data amount, storing the host write data and the collected write data into the open block of the flash memory until the open block is full, wherein the residual storage space of the open block is an estimated residual storage space of the open block considering if the host write data in the buffer are stored into the open block;
   performing a block close action and stopping writing the collected write data into the flash memory; and
   clearing the data that are temporarily stored in the buffer.

14. The data writing method as claimed in claim 13, wherein the host write data and the collected write data are all valid data.

15. The data writing method as claimed in claim 13, further comprising steps of:
   judging whether the host write data have been completely stored into the flash memory; and
   if the solid state storage device confirms that the host write data have been completely stored into the flash memory, clearing the data that are temporarily stored in the buffer.

16. The data writing method as claimed in claim 15, wherein the flash memory further comprises plural word lines, wherein after a specified number of program procedures are performed on a specified word line, the host write data for being store to the specified word line are completely stored.

17. The data writing method as claimed in claim 13, wherein the garbage collection is performed according to a predetermined data amount, wherein the predetermined data amount is determined to allow the host write data to be completely stored into the flash memory according to the program order.

* * * * *